US012027336B2

(12) United States Patent
Reinmuth et al.

(10) Patent No.: US 12,027,336 B2
(45) Date of Patent: Jul. 2, 2024

(54) CAPACITIVELY OPERABLE MEMS SWITCH

(71) Applicant: Robert Bosch GmbH, Stuttgart (DE)

(72) Inventors: Jochen Reinmuth, Reutlingen (DE); Matthew Lewis, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 213 days.

(21) Appl. No.: 17/653,935

(22) Filed: Mar. 8, 2022

(65) Prior Publication Data

US 2022/0293383 A1 Sep. 15, 2022

(30) Foreign Application Priority Data

Mar. 12, 2021 (DE) ..................... 10 2021 202 409.2

(51) Int. Cl.
*H01H 59/00* (2006.01)

(52) U.S. Cl.
CPC ............................... *H01H 59/0009* (2013.01)

(58) Field of Classification Search
CPC .... H01H 59/0009; H01H 1/20; H01H 1/0036; H01H 1/18; H01H 1/24; H01H 1/60; H01H 2001/0047; H01H 2001/0052; H01H 2001/0068; H01H 2001/0078; H01H 2001/0089; H01H 2059/0063; H01H 2059/0072; B81B 2201/014; B81B 2201/018; B81B 2203/04; B81B 2203/0118; B81B 2201/016; B81B 3/0021; B81B 2207/07; B81B 2203/051; B81B 3/0051; B81B 2203/0109
See application file for complete search history.

(56) References Cited

U.S. PATENT DOCUMENTS

| | | | | |
|---|---|---|---|---|
| 6,507,138 | B1 * | 1/2003 | Rodgers ................ | B81B 3/0021 310/309 |
| 6,798,315 | B2 * | 9/2004 | Schaefer ............ | H01H 59/0009 200/253.1 |
| 7,692,521 | B1 | 4/2010 | Cohn | |
| 2003/0098618 | A1 | 5/2003 | Greenberg et al. | |
| 2005/0099252 | A1 | 5/2005 | Isobe et al. | |
| 2006/0087390 | A1 | 4/2006 | Yuba et al. | |
| 2009/0260960 | A1 | 10/2009 | Gritters et al. | |

* cited by examiner

*Primary Examiner* — Ahmed M Saeed
(74) *Attorney, Agent, or Firm* — NORTON ROSE FULBRIGHT US LLP; Gerard A. Messina

(57) ABSTRACT

A MEMS switch having a substrate, a micromechanical function layer situated above the substrate, and a fixed part and an electrically operable, deflectable switch element are developed in the micromechanical function layer, the switch element for closing an electrically conductive contact with the fixed part being suspended on at least one first spring in a deflectable manner. In a first operating state, the switch element is in a first position at a first distance from the fixed part, and the electrical contact is open. In a second operating state, the switch element is in a second position at a second distance from the fixed part, and the first spring is deflected and exerts a first restoring force, and the switch element establishes an operative connection with at least one second spring and the electrical contact is open. In a third operating state, the switch element is in a third position.

7 Claims, 7 Drawing Sheets

CAPACITIVELY OPERABLE MEMS SWITCH

CROSS REFERENCE

The present application claims the benefit under 35 U.S.C. § 119 of German Patent Application No. DE 10 2021 202 409.2 filed on Mar. 12, 2021, which is expressly incorporated herein by reference in its entirety.

BACKGROUND INFORMATION

The present invention relates to an electrically operable MEMS switch having a substrate and a micromechanical function layer situated above the substrate, a fixed part and an electrically operable deflectable switch element being developed in the micromechanical function layer, and the switch element is suspended in a deflectable manner on at least one first spring for closing an electrically conductive contact with the fixed part.

Different types of relays are available in the related art. Most relays have a relatively high current consumption. They are typically driven electromagnetically and require a solenoid coil for their operation. This makes it possible to generate great forces. However, relays of this type have a high current consumption because of the required coil.

Recently, capacitively operable switches have also become available. They have a very low current consumption because of their drive principle. For instance, a MEMS switch ADGM 1304 is manufactured by Analog Devices (FIG. 1), which is produced using surface micromechanics. The switch element is movably produced out of the substrate plane. German Patent Application No. DE 10 2021 202 238.3, describes a capacitively operable MEMS switch which has a switch element that is movable parallel to the substrate plane (in-plane) (FIG. 2).

Capacitive MEMS relays offer the advantage of having a very low movable mass on account of the size of the MEMS element, which therefore allows for very fast switch-on operations. The MEMS elements are usually driven by plate capacitor arrays. The force of the capacitor is proportional to the reciprocal distance. As a result, the power is greatest in the switched-on state. In a switch-on operation, the movable MEMS is gradually accelerated and experiences the greatest acceleration shortly before the switching operation. The contact is therefore closed at a very high speed. This has an advantageous effect on the service life of the relay contacts when the relay is closed in the non-currentless state insofar as flashovers, which reduce the service life of the contact areas, are able to form only briefly in such a case.

A disadvantage of a capacitive drive is that only very low forces are able to be generated and these forces do not exhibit a linear characteristic across the deflection. The movable structure is pulled back by a spring which in a good approximation always has a linear force that is proportional to the deflection. This behavior according to which the drive force exhibits a reciprocal behavior to the deflection and the restoring force features a linear response thereto is particularly disadvantageous for the switch-off operation of a relay. Like the switch-on operation, the switch-off operation should occur as quickly as possible, which means that a great restoring force would be especially advantageous. As may be gathered from FIG. 7A, it may happen, for example, that when a restoring force is used that amounts to half the magnitude of the capacitive force during the switching state, the restoring force at a deflection of 0.5 μm has the same magnitude as the capacitive force, which means that the relay is unable to be switched on and a low restoring force has to be used. Thus, the restoring force is always restricted in this system, which leads to a slow switch-off operation and has a negative effect on the service life of the component.

SUMMARY

A system for a capacitively actuated MEMS relay that allows for higher restoring forces with the capacitive drive remaining unchanged is desired.

In accordance with an example embodiment of the present invention, in a first operating state, the switch element is situated in a first position at a first distance from the fixed part and the electrical contact is open. In addition, in a second operating state, the switch element is situated in a second position at a second distance from the fixed part, the second distance being smaller than the first distance, and the first spring is deflected and exerts a first restoring force, the switch element establishing an operative connection with at least one second spring (12) and the electrical contact being open. Finally, in a third operating position, the switch element is situated in a third position in which the switch element rests against the fixed part and the electrically conductive contact is closed, the first spring being deflected and exerting a first restoring force, and the second spring being deflected and exerting a second restoring force.

In an advantageous manner, the first spring, i.e., the suspension of the movable switch element, has a rather soft configuration, which means that it is configured with an initially low restoring force. In addition, the at least one second spring is inserted into the contact travel, with which the deflectable switch element establishes an operative connection before the switch element closes the contact.

The second spring is advantageously either anchored to the substrate and the switch element touches the movable end of this spring structure (see FIGS. 4-6), or the second spring is positioned on the switch element and in a deflection of the switch element, the end of the second spring not connected to the switch element touches a stop firmly anchored to the substrate (not shown in the figures). This makes it possible to generate a very efficient and defined increase in the restoring force just before contact is made, without any position of the movable structure existing where the restoring force and the capacitive force are of a similar magnitude (see FIG. 7B).

In an advantageous manner, a very high restoring force is able to be generated especially in the switching state. If the capacitive drive is switched off, the movable mass of the switch element is subjected to a very high force and thus a high acceleration, especially at the start of the return movement in the direction of the neutral position, thereby making it possible to perform the switch-off operation much more rapidly than at present. This is advantageous for the service life of the relay contacts when the relay is opened in a current-carrying state insofar as flashovers, which reduce the service life of the contact areas, can then occur only very briefly. In the same way, adhesion processes between the contact electrodes are able to be released faster and more easily.

In accordance with an example embodiment of the present invention, especially advantageous is at least one second spring, which at the earliest makes contact with the switch element after half a deflection between the first operating state (neutral state) and the third operating state (contact state).

In accordance with an example embodiment of the present invention, it is also advantageous if the restoring force FR2

(+FR3+), which is generated in the contact state, i.e., in the third operating state, by the first and second springs and possibly by third and further springs, is greater than half the restoring force of first spring FR1 alone FR2+(FR3+ . . . )>0.5*FR1.

It is particularly advantageous if restoring force FR2+(FR3+ . . . ) generated by the spring structure in the contact state is greater than the restoring force of movable MEMS structure FR1.

This may advantageously be achieved through the use of multiple second springs (FR2+FR3+ . . . )>FR1.

It is advantageous that the second spring and the part of the switch element or the stop that comes into contact with the second spring in the second operating state lie at the same electrical potential.

The use of multiple second springs is also advantageous. As illustrated in FIG. 4, for example, this makes it possible to achieve a very symmetrical release of the contact state.

In particular in the case of relays that have a large contact gap in the neutral state and are configured for high voltages, for example, it may be especially advantageous to provide not only the at least one second spring but also at least one third spring or even further springs, which make contact with the switch element at different deflections of the switch element in order to thereby generate a strong restoring force also at very large contact gaps despite the non-linear characteristic of the electrostatic force. It is therefore advantageous to provide also third and further springs in addition to one or multiple second springs, which strike against one another in a cascading manner or strike stops or the switching element during a switching movement of the deflectable switch element.

Additional advantageous embodiments of the present invention may be gathered from the disclosure herein.

DETAILED DESCRIPTION OF EXAMPLE EMBODIMENTS

Figure 1:
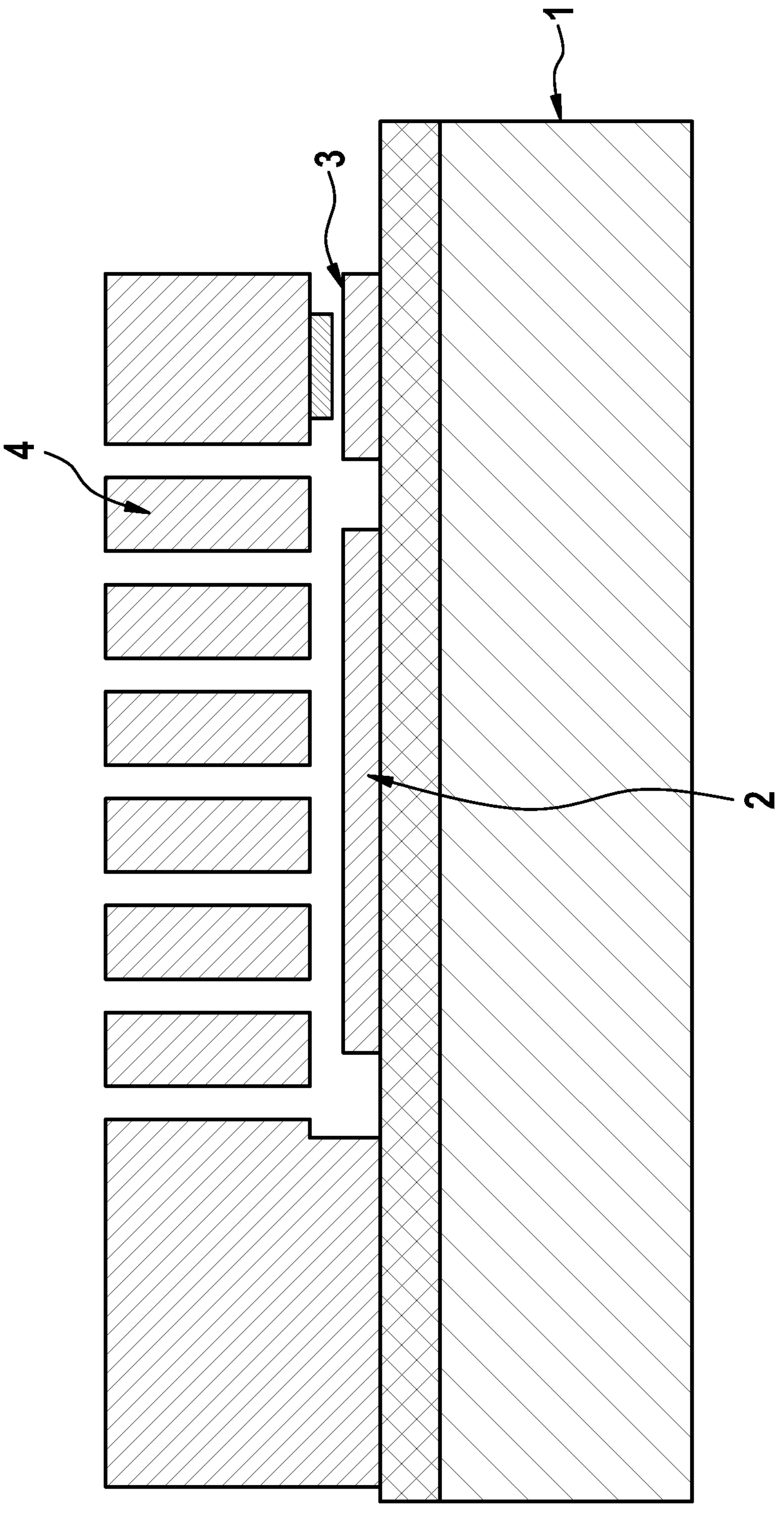
FIG. 1 Related Art
FIG. 1 schematically shows a capacitively operable MEMS switch having an out-of-plane switch element in the related art.

FIG. 1 schematically shows a sectional view of an electrically operable MEMS switch in the related art. A first electrode 2 and a first contact area 3 are provided on a substrate 1. A lever structure 4 is situated above both structures and separated by a gap. If a voltage is applied between the lever and the first electrode, then a movement out of the substrate plane=(out-of-plane) occurs. The lever is essentially deflected perpendicular to the substrate, and a contact between the lever and a contact area is established.

Figure 2:
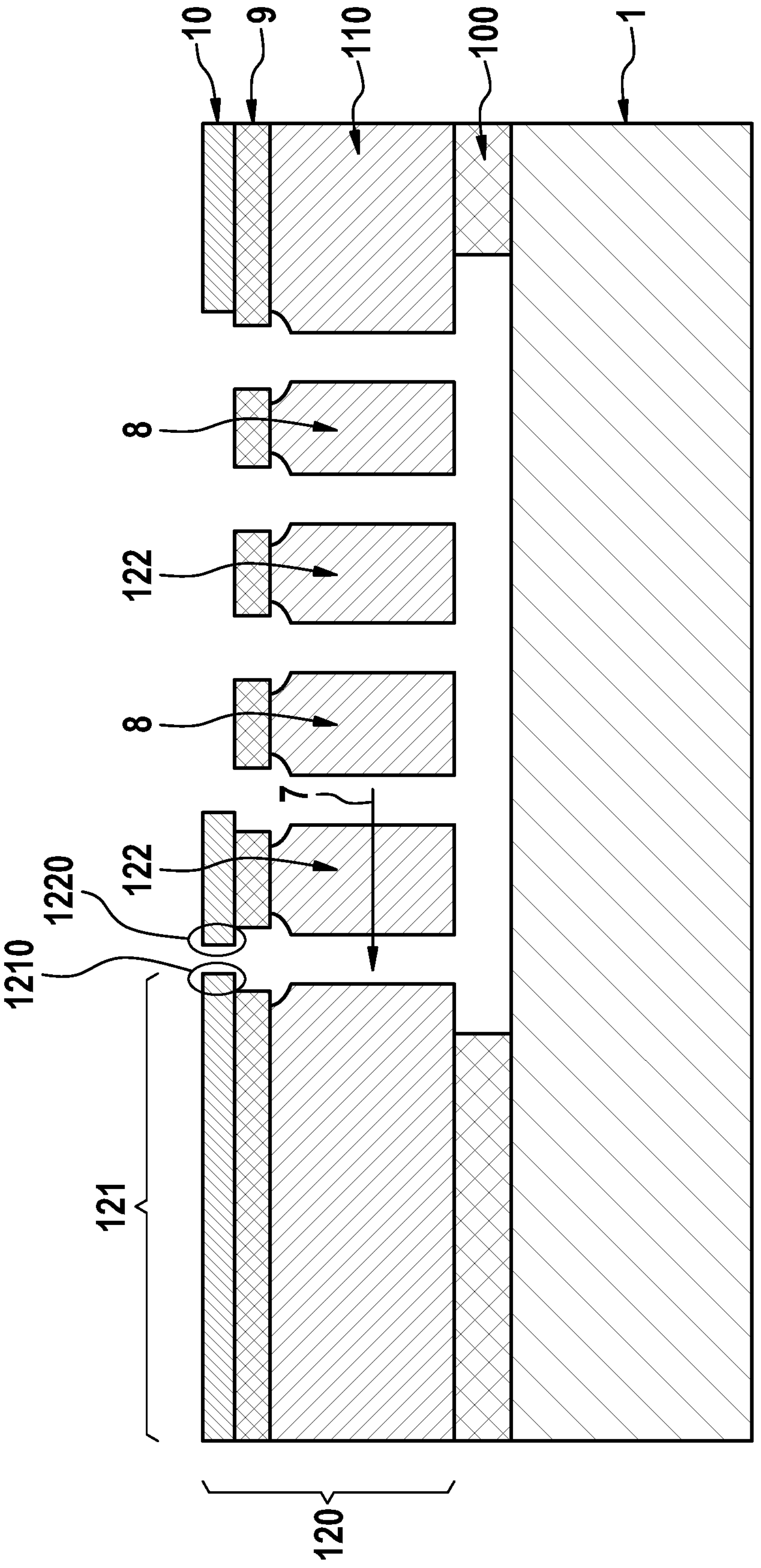
FIG. 2 schematically shows a capacitively operable MEMS switch having an in-plane switch element.

FIG. 2 schematically shows a sectional view of a capacitively operable MEMS switch having an in-plane switch element. A first insulation layer 100, a silicon layer 110, a second insulation layer 9, and a metal layer 10 are situated on top of one another on a substrate 1. The silicon layer, the second insulation layer and the metal layer jointly form a micromechanical function layer 120 in which a fixed part 121, an electrically operable deflectable switch element 122 and fixed electrodes 8 are developed.

A first contact area 1210 is developed in metal layer 10 of fixed part 121, and a second contact area 1220 is developed in metal layer 10 of switch element 122. The switch element is deflectable in at least a first direction 7 parallel to a main extension plane (x,y) of the substrate. This enables the first and second contact areas to make mechanical contact with one another and thus close an electrical contact. The deflection of switch element 122 is induced by applying an electrical voltage to oppositely situated electrode fingers 8 anchored to the substrate. First contact region 1210 and second contact region 1220 are connected to a separate circuit trace in each case. As a result, an electrical connection between the circuit traces is able to be switched on and off by deflecting switch element 122.

Figure 3:
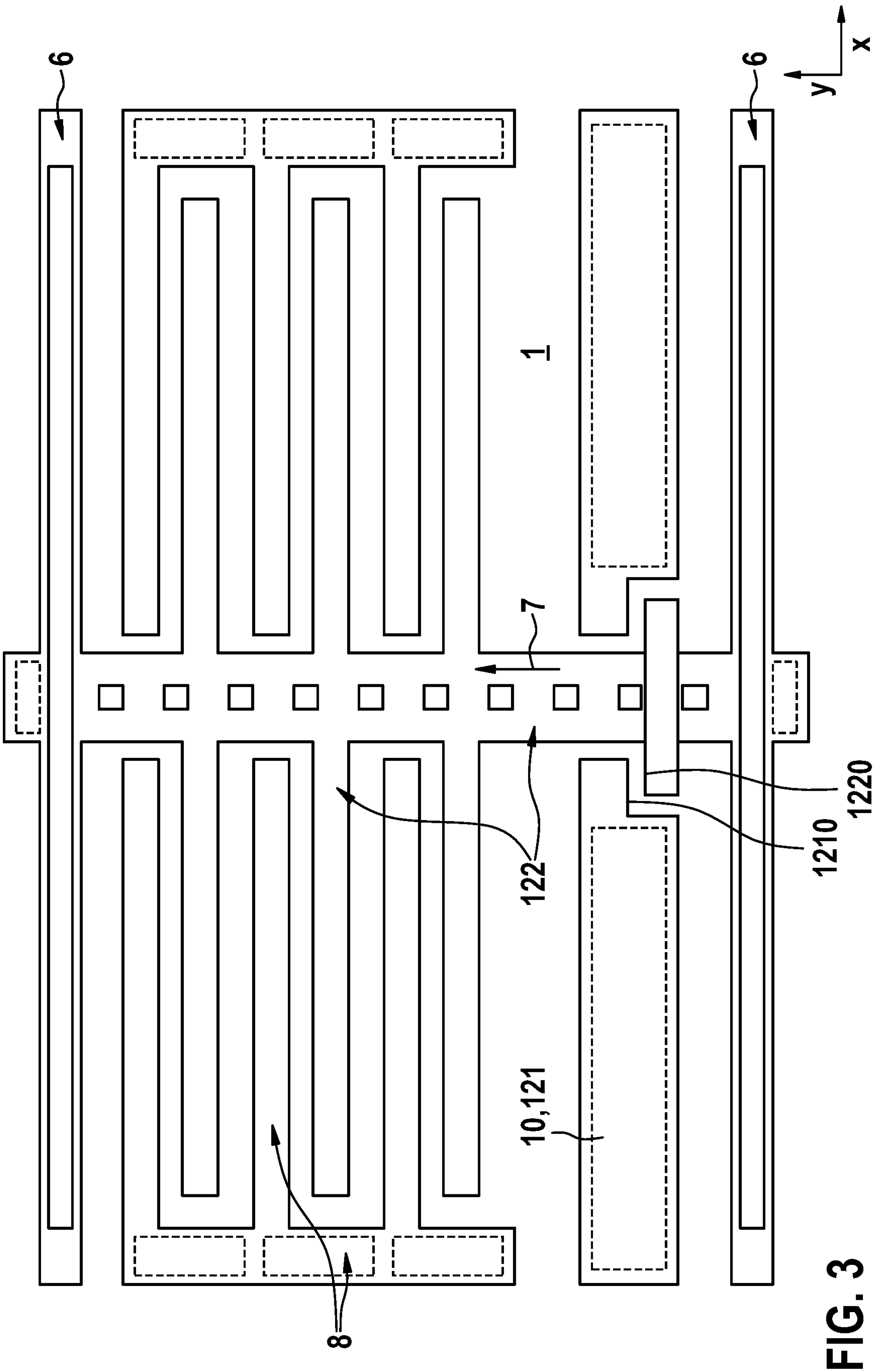
FIG. 3 schematically shows a top view of the capacitively operable MEMS switch with an in-plane switch element.

FIG. 3 schematically shows a top view of the capacitively operable MEMS switch having an in-plane switch element. Suspension springs 6, which are anchored to substrate 1 situated below, carry movable switch element 122. Fixed electrodes 8 and fixed part 121 are shown in addition. The fixed electrodes are situated opposite corresponding shapes of switch element 122 and form the capacitor plates of a capacitive drive together with them. Fixed part 121 and a region of switch element 122 situated opposite are covered by metal layer 10 and form a switchable electrical contact there.

Figure 4:
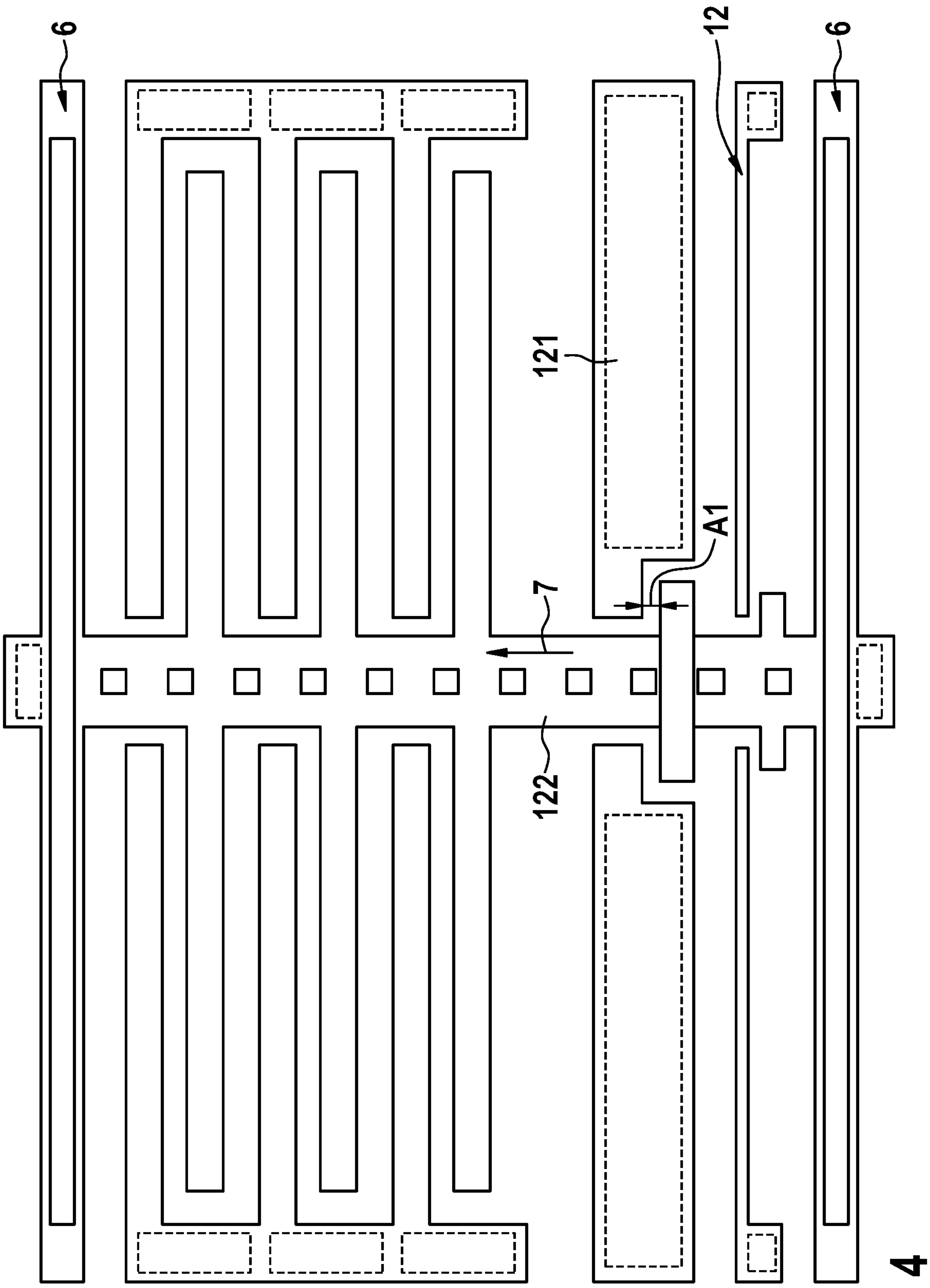
FIG. 4 schematically shows an electrically actuable MEMS switch according to an example embodiment of the present invention in a first operating state.

FIG. 4 schematically shows an electrically operable MEMS switch according to the present invention in a first operating state. The illustration shows an in-plane MEMS relay according to the present invention in a top view in the basic or neutral state. Switch element 122 is situated in a first position at a first distance A1 from fixed part 121. The electrical contact is therefore open. In contrast to FIG. 3, the device has an additional symmetrical spring structure made up of two second springs 12. The symmetrical spring system allows for a symmetrical force introduction into the switch element when it passes through its switching path.

Figure 5:
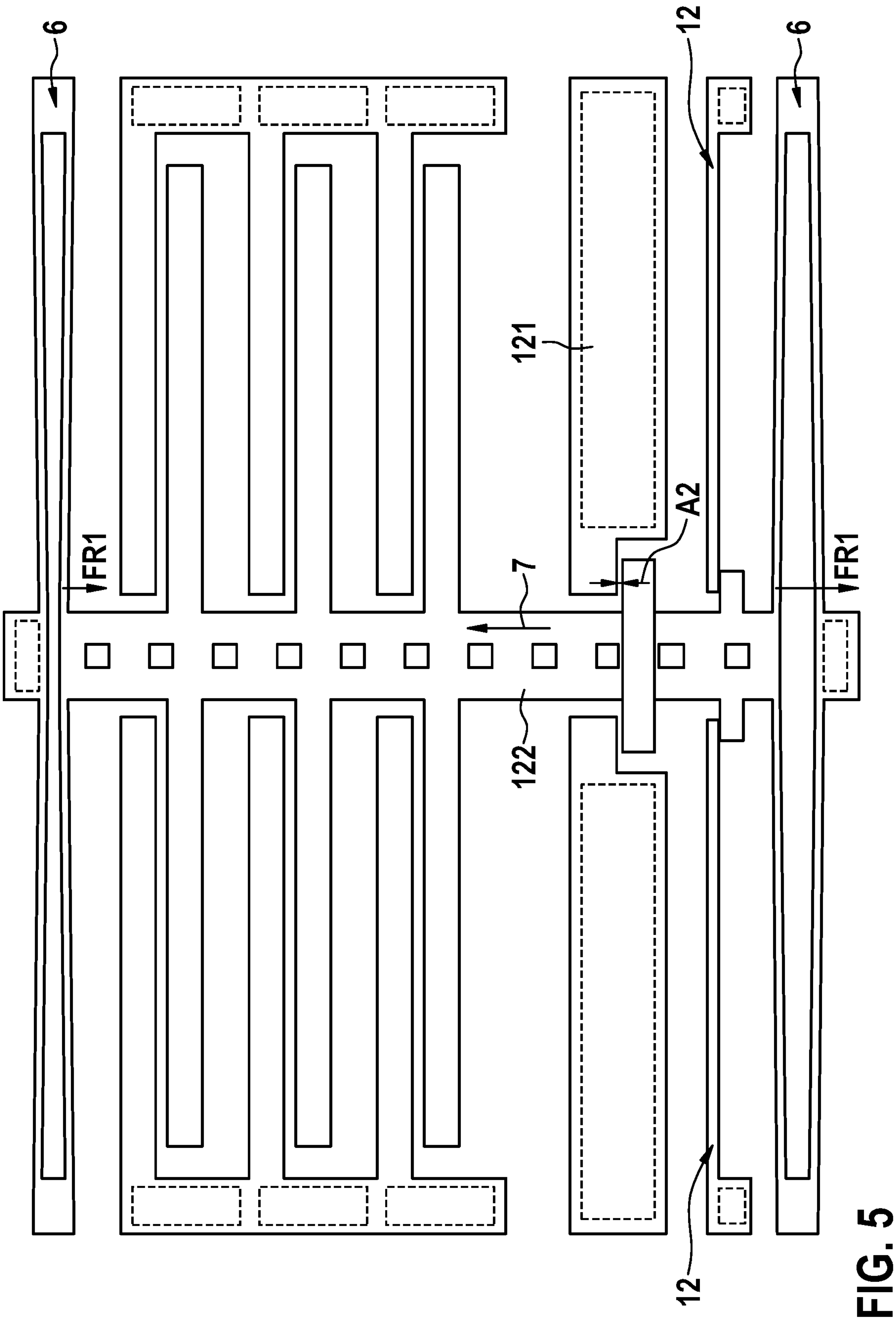
FIG. 5 schematically shows the electrically operable MEMS switch according to an example embodiment of the present invention in a second operating state.

FIG. 5 schematically shows the electrically operable MEMS switch according to the present invention in a second operating state. The illustration shows the in-plane MEMS relay in a top view with second springs 12 in a transition state when the movable MEMS structure just touches the second springs. Switch element 122 is deflected in first direction 7 and situated in a second position at a distance A2 from fixed part 121. Second distance A2 is smaller than first distance A1. The electrical contact is still open. First spring 6 is deflected from the neutral position and exerts a first restoring force FR1 on the switch element. The switch element rests against two second springs 12.

Figure 6:
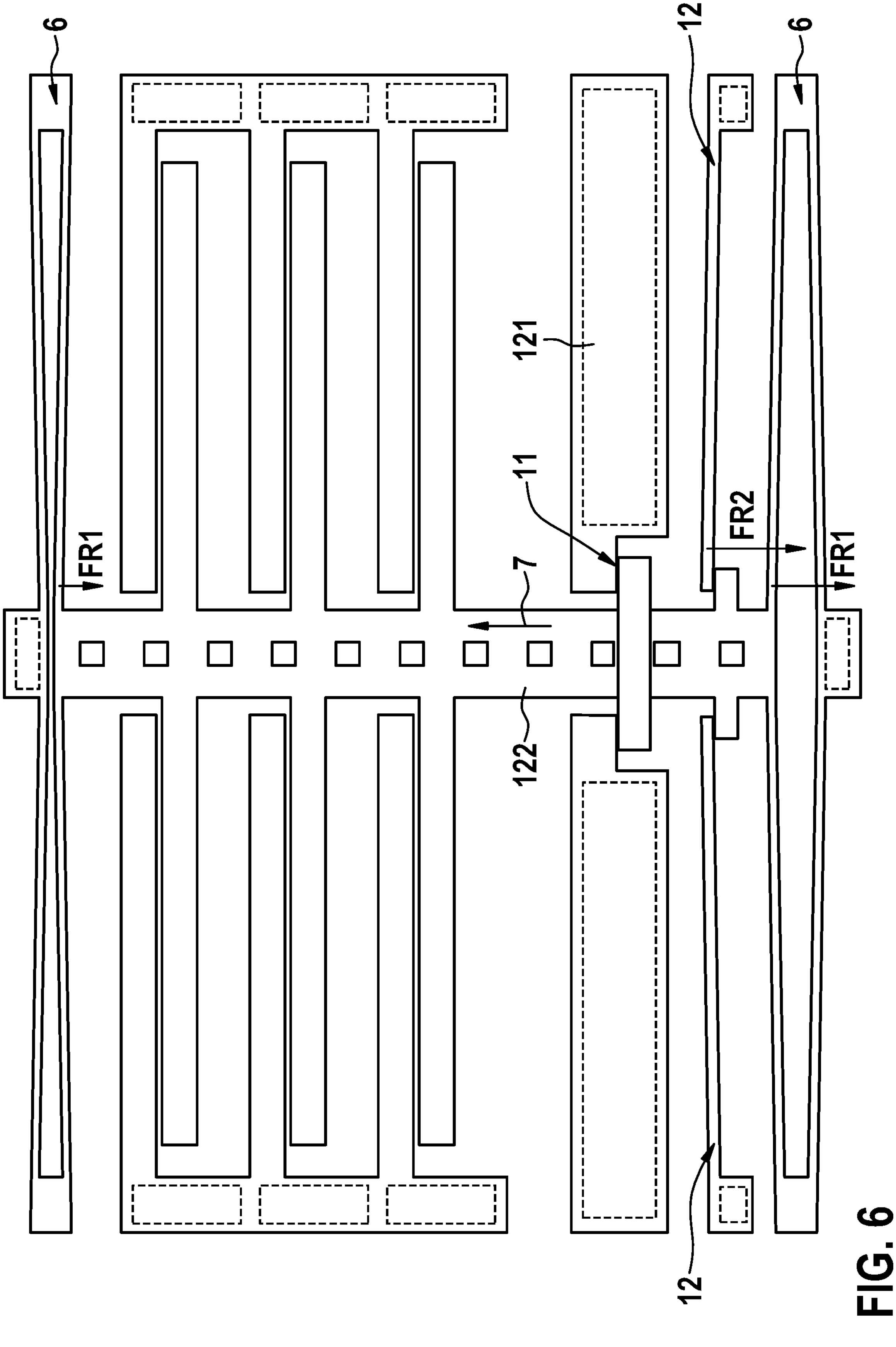
FIG. 6 schematically shows the electrically operable MEMS switch according to an example embodiment of the present invention in a third operating state.

FIG. 6 schematically shows the electrically operable MEMS switch according to the present invention in a third operating state. The illustration shows the in-plane MEMS relay in a top view with the second springs in the switched-on state.

Switch element 122 is farther deflected in first direction 7 and situated in a third position. The switch element rests against fixed part 121 and electrical contact 11 is closed. First spring 6 is deflected farther from the neutral position and exerts a first restoring force FR1 on the switch element that is correspondingly greater than in the second operating state. In addition, the two second springs 12 are deflected and exert a second restoring force FR2 on the switch element.

Optionally, in addition to one or more second spring(s), a third and also further springs (not shown in the drawing) may be situated in the MEMS switch according to the present invention, which one after the other engage in an operative connection with the switch element while it passes through the contact travel. If the second and additional springs are placed at a different distance from the movable system, then an especially high restoring force with cascading spring structures is easily achievable for the switch element in the deflected and in particular in the switched state.

Figure 7B:
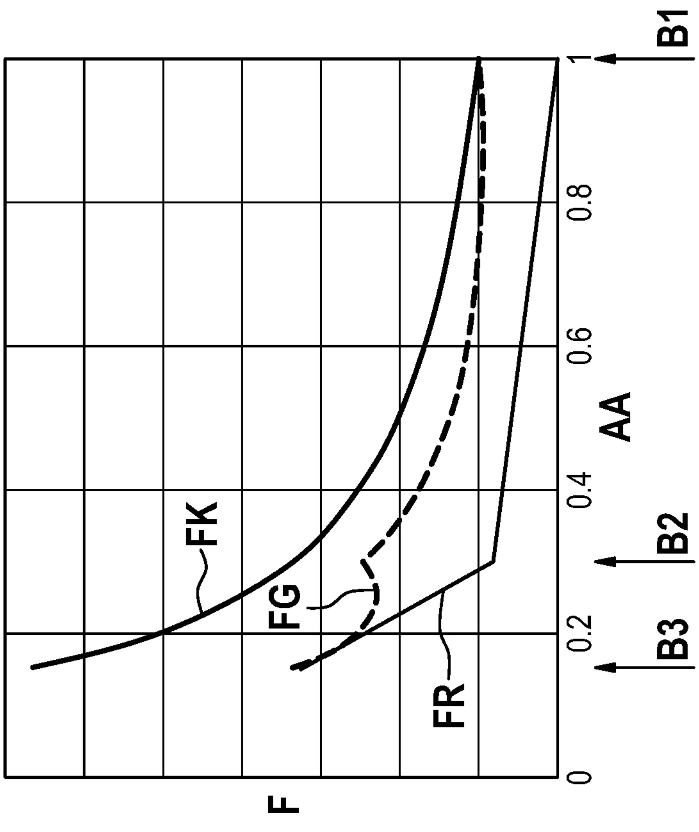
FIG. 7B shows the restoring force, the capacitive force, and the total force of a capacitively operable MEMS switch of the present invention according to FIGS. 4 through 6.
Figure 7A:
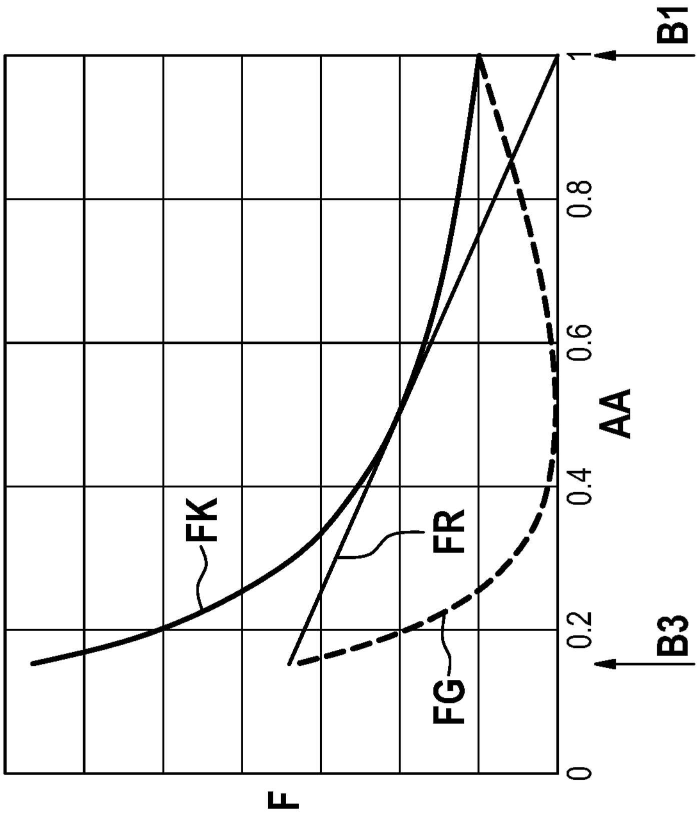
FIG. 7A shows the restoring force, the capacitive force, and the total force of a capacitively operable MEMS switch according to FIG. 3.

FIG. 7A shows the restoring force, the capacitive force, and the total force of a capacitively operable MEMS switch according to FIG. 3. Shown is capacitive force FK, restoring force FR and resulting total force FG on the switch element as a function of distance AA of the capacitor plates of the capacitive drive. Marked is first operating state B1, i.e., the non-deflected neutral state directly after the capacitive drive is switched on, in which distance AA amounts to 1000 nm by way of example. A capacitive force FK is present. Restoring force FR is equal to zero. Also marked is third operating state B3, i.e., the switched state in which the electrical contact is closed and distance AA still amounts to 150 nm. Capacitive force FK is high relative to FR because of the low distance AA and dependencies $FK \sim 1/AA^2$, $FR \sim 1/(1-AA)$. Due to these dependencies, however, there also exists a transition range between the first and third operating state in which total force FG=FK−FR for closing the contact drops to near zero.

FIG. 7B shows the restoring force, the capacitive force, and the total force of a capacitively operable MEMS switch of the present invention according to FIGS. 4-6. Shown are capacitive force FK, restoring force FR, and resulting total force FG on the switch element as a function of distance AA of the capacitor plates of the capacitive drive.

Marked is first operating state B1, i.e., the non-deflected neutral state directly after the capacitive drive is switched on with capacitive drive force FK, the restoring force in neutral state FR=0, and the total force on switch element FG+FK.

Also marked is second operating state B2 in which the switch element has traversed a first portion of the contact travel and rests against the second springs just then. The restoring force up to this point is generated by the restoring force of the first springs FR=FR1. In comparison with the case according to FIG. 7A, the first spring has a relatively soft development and generates only a low restoring force. The switch element may thus be easily and rapidly moved to the closed position using a high total force FG=FK−FR.

Also marked is third operating state B3 in which the contact is closed. The restoring force overall is generated by the restoring force of the first springs and second springs FR=FR1+FR2. Capacitive force FK is relatively high at the low distance of the capacitor plates. However, total force FG=FK−FR is able to be restricted by the combined restoring forces of the first and second springs.

In particular, it becomes clear here that the use of second springs 12 makes it possible to achieve a high restoring force FR=FR1+FR2; nevertheless, a positive total force FG=FK−FR for closing the contact in a switching case is present at every deflection of the switching element.

LIST OF REFERENCE NUMERALS

1 substrate
2 first electrode
3 first contact area
4 lever structure
6 suspension spring, first spring
7 first direction
8 fixed electrode
9 second insulation layer
10 metal layer
11 contact
12 additional spring structure, second spring
100 first insulation layer
110 silicon layer
120 micromechanical function layer
121 fixed part
122 deflectable switch element
1210 first contact area
1220 second contact area
A1 first distance
A2 second distance
B1 first operating state
B2 second operating state
B3 third operating state
FR1 first restoring force
FR2 second restoring force

What is claimed is:

1. An electrically operable MEMS switch, comprising:

a substrate; and a micromechanical function layer situated above the substrate, a fixed part and an electrically operable deflectable switch element being developed in the micromechanical function layer, the switch element being configured to close an electrically conductive contact with the fixed part and being situated on at least one first spring in a deflectable manner;

wherein:

in a first operating state, the switch element is situated in a first position at a first distance from the fixed part, the electrical contact is open, and the switch element not yet having an operative connection with at least one second spring;

in a second operating state, the switch element is situated in a second position at a second distance from the fixed part, the second distance being smaller than the first distance, the first spring is deflected and exerts a first restoring force, the switch element establishing the operative connection with the at least one second spring, and the electrical contact is open; and in a third operating state, the switch element is situated in a third position in which the switch element rests against the fixed part and the electrically conductive contact is closed, the first spring being deflected and exerting a first restoring force, and the second spring being deflected and exerting a second restoring force.

2. The electrically operable MEMS switch as recited in claim 1, wherein the MEMS switch has a capacitive drive for deflecting the switch element for closing the electrically conductive contact.

3. The electrically operable MEMS switch as recited in claim 2, wherein the capacitive drive has capacitor plates having a variable distance.

4. The electrically operable MEMS switch as recited in claim 2, wherein the capacitive drive has capacitor plates having a variable coverage area.

5. The electrically operable MEMS switch as recited in claim 1, wherein the switch element for closing the electrically conductive contact is deflectable in at least a first direction parallel to a main extension plane of the substrate.

6. An electrically operable MEMS switch, comprising:
a substrate; and
a micromechanical function layer situated above the substrate, a fixed part and an electrically operable deflectable switch element being developed in the micromechanical function layer, the switch element being configured to close an electrically conductive contact with the fixed part and being situated on at least one first spring in a deflectable manner;
wherein:
in a first operating state, the switch element is situated in a first position at a first distance from the fixed part and the electrical contact is open;
in a second operating state, the switch element is situated in a second position at a second distance from the fixed part, the second distance being smaller than the first distance, and the first spring is deflected and exerts a first restoring force, the switch element establishing an operative connection with at least one second spring and the electrical contact is open, wherein the second spring is anchored to the fixed part or to the substrate, and the switch element rests against a movable part of the second spring to establish the operative connection; and
in a third operating state, the switch element is situated in a third position in which the switch element rests against the fixed part and the electrically conductive contact is closed, the first spring being deflected and exerting a first restoring force, and the second spring being deflected and exerting a second restoring force.

7. An electrically operable MEMS switch, comprising:
a substrate; and
a micromechanical function layer situated above the substrate, a fixed part and an electrically operable deflectable switch element being developed in the micromechanical function layer, the switch element being configured to close an electrically conductive contact with the fixed part and being situated on at least one first spring in a deflectable manner;
wherein:
in a first operating state, the switch element is situated in a first position at a first distance from the fixed part and the electrical contact is open;
in a second operating state, the switch element is situated in a second position at a second distance from the fixed part, the second distance being smaller than the first distance, and the first spring is deflected and exerts a first restoring force, the switch element establishing an operative connection with at least one second spring and the electrical contact is open wherein the second spring is anchored to the switch element, and a movable part of the second spring rests against a stop anchored to the substrate to establish the operative connection; and
in a third operating state, the switch element is situated in a third position in which the switch element rests against the fixed part and the electrically conductive contact is closed, the first spring being deflected and exerting a first restoring force, and the second spring being deflected and exerting a second restoring force.

* * * * *